(12) United States Patent
Pickhardt (10) Patent No.: US 12,362,577 B2
(45) Date of Patent: Jul. 15, 2025

(54) HOUSING FOR RECEIVING A COMMUNICATION MODULE

(71) Applicant: Andreas Stihl AG & Co. KG, Waiblingen (DE)

(72) Inventor: Moritz Pickhardt, Stuttgart (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 878 days.

(21) Appl. No.: 17/542,094

(22) Filed: Dec. 3, 2021

(65) Prior Publication Data

US 2022/0181895 A1 Jun. 9, 2022

(30) Foreign Application Priority Data

Dec. 3, 2020 (EP) .................................... 20211645

(51) Int. Cl.
*H02J 7/00* (2006.01)
*H01M 10/42* (2006.01)
*H01M 50/233* (2021.01)

(52) U.S. Cl.
CPC ......... *H02J 7/0045* (2013.01); *H01M 10/425* (2013.01); *H01M 50/233* (2021.01); *H02J 7/0047* (2013.01)

(58) Field of Classification Search
CPC ........ H02J 9/02; H02J 7/00034; H02J 7/0024; H02J 7/0029; H02J 2310/23; H02J 7/0063; H02J 7/007; H02J 7/00714; H02J 7/007182; H02J 7/007194; H02J 7/0045; H02J 50/10; H02J 50/80; H02J 50/90; H02J 7/0048; H02J 7/02; H02J 7/0047; H02J 9/005; H01M 10/425; H01M 2220/30; H01M 50/213; H01M 50/247; H01M 10/46; H01M 10/48; H01M 10/488; H01M 2220/20; H01M 50/204; H01M 50/209; H01M 50/249; H01M 6/02; H01M 6/5044; H01M 50/233
USPC .................................................. 320/106–115
See application file for complete search history.

(56) References Cited

U.S. PATENT DOCUMENTS

2010/0221584 A1 9/2010 Reber
2013/0207596 A1* 8/2013 Zichner ............... H01M 10/615
29/623.1
2014/0159662 A1 6/2014 Furui et al.
(Continued)

FOREIGN PATENT DOCUMENTS

DE 10 2009 012 176 A1 9/2010
EP 2 998 073 A1 3/2016
EP 3 000 563 A1 3/2016

*Primary Examiner* — Binh C Tat
(74) *Attorney, Agent, or Firm* — Walter Ottesen, P.A.

(57) ABSTRACT

A housing has a communication module arranged in a housing body. Electrical contacts are provided under a closure cover of the housing and are electrically connected to electrical components arranged in the housing body. The communication module is placed on the electrical contacts and is fixed in position in a receptacle fixed to the housing body. Contact elements of the communication module are in electrical contact with the electrical contacts in the housing body. The communication module is pressed onto the electrical contacts by at least one pressure element, with the pressure element being arranged between the closure cover and the communication module.

17 Claims, 10 Drawing Sheets

(56) References Cited

U.S. PATENT DOCUMENTS

2016/0064781 A1\* 3/2016 Specht ................ H01M 10/488
  429/90
2018/0294536 A1\* 10/2018 Kruszelnicki ....... H01M 50/291

\* cited by examiner

HOUSING FOR RECEIVING A COMMUNICATION MODULE

CROSS REFERENCE TO RELATED APPLICATION

This application claims priority of European patent application no. 20 211 645.5, filed Dec. 3, 2020, the entire content of which is incorporated herein by reference.

TECHNICAL FIELD

The disclosure relates generally to a housing, especially a housing for a battery pack, a housing for a handheld work apparatus or a housing for a hand-carried work apparatus or similar housing. Electrical contacts are provided under a closure cap of the housing, which contacts are electrically connected to electrical components arranged in the housing.

BACKGROUND

Modern work apparatuses, regardless of whether they are driven by an electric motor, a battery-operated electric motor or an internal combustion engine, are equipped with data storage devices or similar components in order to record the operating data accruing during operation and to evaluate it, especially for subsequent maintenance. The recorded operating data can be used to detect faults that have occurred during servicing or that are likely to occur in the future and to initiate appropriate countermeasures. If, on the other hand, inadmissible operating conditions occur during the operation of a work apparatus, the data generated are recorded, but countermeasures to protect the drive motor or the tool can often only be initiated with a delay due to the lack of evaluation of the generated data.

SUMMARY

The solution provided is based on the problem of promptly outputting the data accruing during the operation of a device so that suitable interventions to protect the device are possible at an early stage.

A communication module is placed on the electrical contacts provided under a closure cap of the housing, the communication module forming an independent component. It is of particular advantage that the communication module can be installed only when required, and the installation can be carried out within the scope of a service by trained service staff. However, due to the simple configuration, the installation in the housing can also be carried out by an untrained user, such as the end customer. The communication module is positioned and fixed in position in the housing in a simple manner by means of a receptacle fixed to the housing.

The communication module has a contact side facing the contacts in the housing with contact elements provided on the contact side. When inserted into the receptacle fixed to the housing, the contact elements of the communication module come to rest on the contacts in the housing, making electrical contact. In order to ensure on the one hand that the communication module is fixed in the receptacle fixed to the housing and on the other hand to ensure a secure electrical contact between the contacts in the housing and the contact elements of the communication module, it is intended to provide a pressure element between the closure cap and the communication module. When the cap is closed, the pressure element exerts a pressing force on the communication module, whereby the communication module is pressed onto the contacts of the housing.

The communication module is in wireless communication with an external transmitting and/or receiving unit. Such a transmitting and/or receiving unit can be, for example, a smartphone, a tablet or a transmitting and/or receiving unit specially configured for communication with the communication module. A user of a work apparatus can thus monitor the drive unit and/or the tool during operation using the data output via the communication module and can intervene if necessary.

The communication module, which forms an independent component, has a substantially rectangular basic shape with a longitudinal axis, wherein the contact elements of the communication module are arranged in particular symmetrically to the longitudinal axis of the communication module. The contact elements of the communication module are preferably configured here as contact springs. Other configurations of the contact elements can be advantageous. For example, it is also advantageous if the electrical contacts provided under the closure cap are alternatively configured as contact springs. A configuration in which some of the electrical contacts provided under the closure cap are configured as contact springs and some of the contact elements of the communication module are configured as contact springs can also be useful.

To form the receptacle fixed to the housing, at least one mechanical engagement element is provided between the receptacle fixed to the housing and the communication module. The mechanical engagement element is configured in such a way that it fixes the communication module to the housing. This can be done by an engagement element fixed to the housing, which engages in a corresponding engagement opening of the communication module. Alternatively, the communication module can have a mechanical engagement element that engages in a corresponding engagement opening of the receptacle in the receiving space. In both cases, the mechanical engagement of the engagement element in the plane of the communication module achieves a form-fitting fixation.

An engagement element can advantageously be formed by a centring pin engaging in a centring opening. In particular, it is provided here that the component of the communication module has the centring opening and the centring pin is held in the housing, expediently in the receptacle, in a manner fixed to the housing.

In a particular embodiment of the disclosure, the component of the communication module has a first centring opening for a first centring pin and a second centring opening for a second centring pin. By arranging two centring pins spaced apart from each other, an alignment of the position of the communication module is achieved.

The component of the communication module has a rectangular basic shape with a longitudinal axis, with the centring opening lying on the longitudinal axis of the communication module. In particular, two centring openings are provided, with one centring opening being located in the region of each narrow side of the communication module. Both centring openings are located in the region of opposite narrow sides of the component of the communication module.

In a particular embodiment of the disclosure, it is provided that a centring opening is open towards the narrow side of the communication module. This makes it possible to insert a centring pin also radially into the centring opening.

The pressure element provided between the component of the communication module and the closure cap is in particular a compressible body. In a simple embodiment, the pressure element is an elastomeric body, for example a foam, in particular a body made of the material Cellasto® (trademark of BASF). It can also be expedient to arrange a spring tongue, a spiral spring or similar spring element as a pressure element.

If the communication module is arranged in the cover of a battery pack, the contacts fixed to the housing can be arranged on a circuit board that closes the battery pack. The circuit board has an inner circuit board side facing the interior of the housing and an outer circuit board side facing away from the interior. The contacts fixed to the housing are provided here on the outer circuit board side. This arrangement ensures a simple electrical connection between the circuit board and the communication module, so that there is no need for additional cable routing. Not only can data be transmitted via the contacts of the circuit board that are fixed to the housing, but the electrical power supply of the communication module can also be ensured.

The contacts provided on the outer side of the circuit board are combined to form a contact field of the circuit board.

The interior of the housing forms a space for receiving a cell group, which is monitored by a monitoring device arranged on the circuit board during charging and discharging operation. For this purpose, the monitoring device is electrically connected to the cell group of the battery pack.

BRIEF DESCRIPTION OF THE DRAWINGS

The invention will now be described with reference to the drawings wherein:

FIG. 18 is an enlarged view corresponding to FIG. 17 of an open receiving space with the communication module arranged therein; and, FIG. 19 is an enlarged view according to FIG. 17 of the receiving space for a communication module with a contact field provided in the base of the receiving space.

DESCRIPTION OF THE PREFERRED EMBODIMENTS

The invention relates generally to a housing 5, in particular a housing for a battery pack 1, a housing for a handheld work apparatus such as, for example, a lawn mower or another ground-guided work apparatus, or else a housing 105, 205 for a handheld and hand-carried work apparatus such as, for example, a blower, a motorized chain saw, a hedge trimmer, a brushcutter or similar work apparatus.

In a first embodiment, aspects of the invention are described in FIGS. 1 to 11 using the example of a housing 5 for a battery pack 1. In the embodiment shown in FIG. 1, the housing 5 has a basic shape which is preferably similar to a cuboid. Broad sides 32 and narrow sides 33 run in the direction of a vertical axis 31 of the basic shape of the battery pack 1. A first end face of the housing or housing body 5 forms a base 34 of the battery pack 1, in which contacts (not shown in more detail) are provided for electrical charging and for electrical power output. The end face of the housing 5 opposite the base 34 forms an open housing end 4, which can especially be closed by a housing cover 30.

The interior 2 of the housing or housing body 5 is accessible via the open housing end 4. Battery cells not shown in more detail are arranged in the interior 2 and are interconnected to form a cell group 3 to provide a desired electrical power.

A printed circuit board 6 (FIG. 3) is held in the housing cover 30 and has an inner printed circuit board side 7 facing the interior 2 of the housing 5 and an outer printed circuit board side 8 facing away from the interior 2. It is practical that the circuit board 6 is configured and arranged in such a way that the circuit board 6 closes the interior 2 of the housing 5.

The housing cover 30 and/or the circuit board 6 preferably seal the interior 2 with the battery cells of the cell group 3 arranged therein in a liquid-tight and/or especially in a gas-tight manner. A pressure relief valve (not shown in more detail) is provided as burst protection and is practically held in the printed circuit board 6 and vents the interior 2 of the housing 5 to the ambient. It may be practical for the pressure relief valve to vent the interior 2 of the housing 5 into a receiving chamber 40 in the housing cover 30.

An electronic monitoring device 9 is arranged on the circuit board 6, especially on the inner circuit board side 7, for monitoring the cell group 3. The battery cells of the cell group 3, which are preferably lithium-ion cells, are monitored by the electronic monitoring device 9 both in charging mode and in power mode (discharging mode).

As can be seen in FIGS. 2 to 5 and 8 to 11, a receiving space 40 for a communication module 12 is provided in the housing cover 30. The receiving space 40 can be closed by a closure cap 10.

The communication module 12 is configured for communication, especially wireless communication, with at least one transmitting and/or receiving unit 44 provided in the environment of the housing 5. Such a transmitting and/or receiving unit 44 can be, for example, a smartphone, a tablet or a transmitting and/or receiving unit 44 specially configured for communication with the communication module 12.

The wireless connection between the communication module 12 and the transmitting and/or receiving unit 44 can be a wireless connection 43. For example, a GSM connection may also be appropriate, as well as preferably a Bluetooth connection, especially a WLAN connection, for example in the 2.4 GHz or 5 GHz range, or preferably an NFC connection (Near Field Communication) or another appropriate wireless connection 43.

Figure 2:
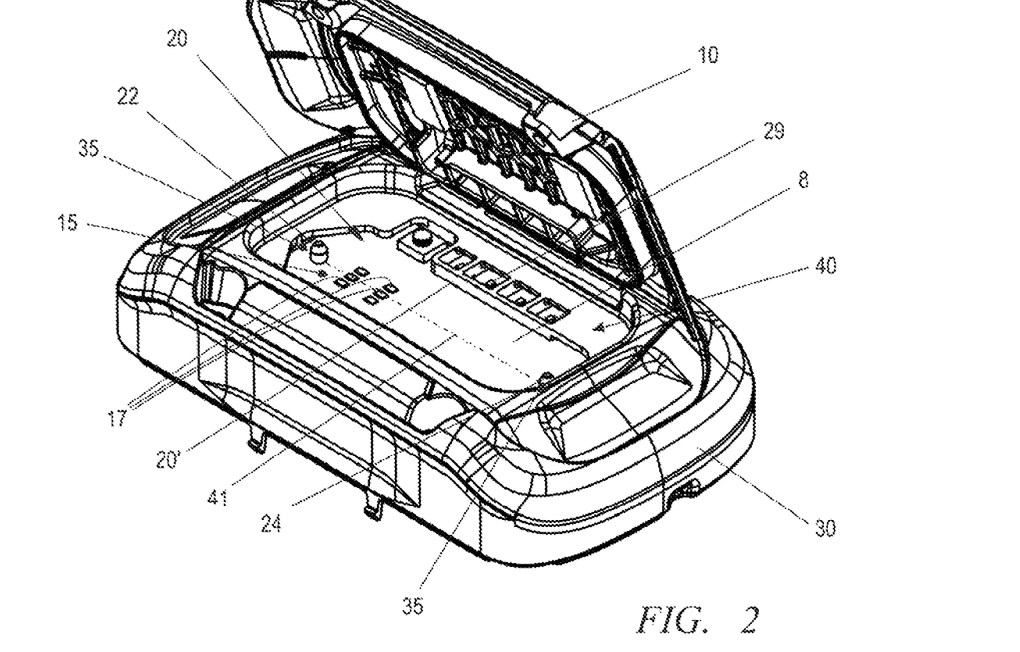
FIG. 2 shows an enlarged perspective view of the housing cover of the housing of a battery pack according to FIG. 1 with a receiving space for a communication module, which receiving space is to be closed by a closure cap.
Figure 3:
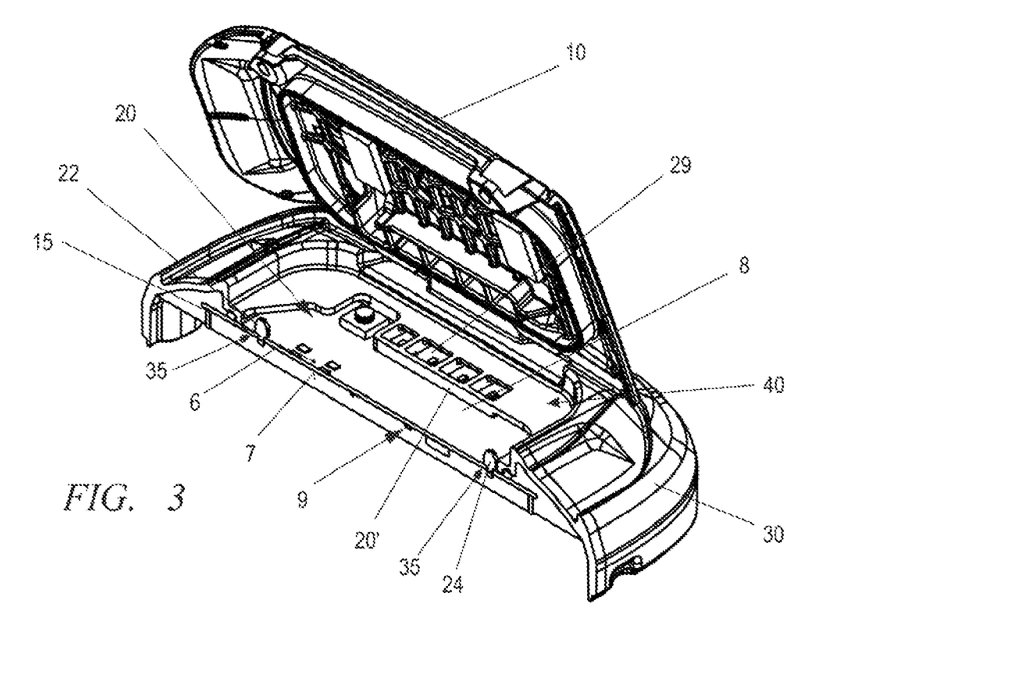
FIG. 3 shows a section through the receiving space formed in the housing cover with a receptacle for a communication module.
Figure 4:
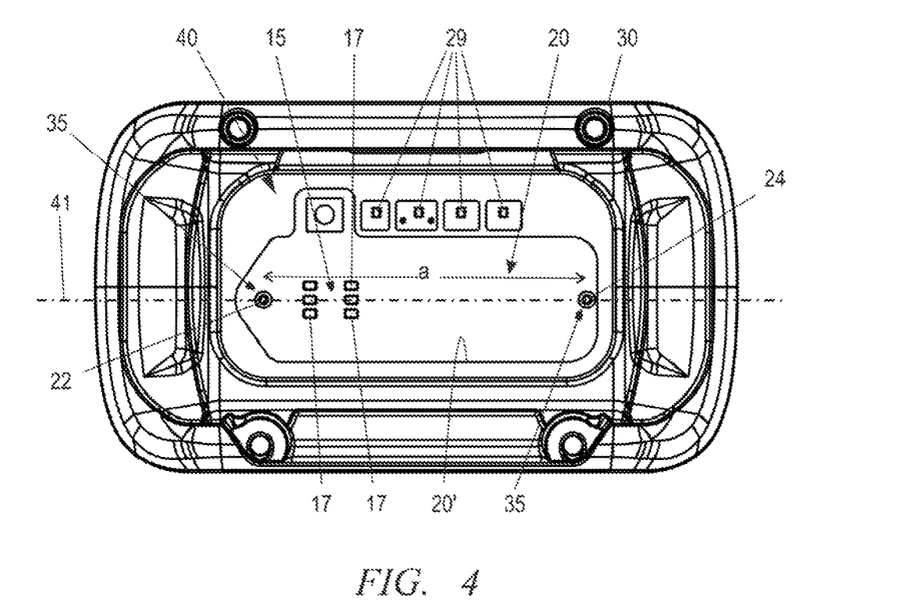
FIG. 4 is a top view of the receiving space for a communication module formed in the housing cover.

FIGS. 2 to 4 show the receiving space 40 formed in the housing cover 30. The receiving space 40 is formed between the circuit board 6 and the closure cap 10. The base of the receiving space 40 is formed in particular by the circuit board 6. The outer circuit board side 8 faces the closure cap 10. The circuit board 6 carries a contact field 15 having a plurality of contacts 17. Furthermore, at least one centring pin 22 is provided in the receiving space 40, which is part of a receptacle 20 for the communication module 12. In the shown embodiment, the receptacle 20 is further delimited by a frame 20' which surrounds the contact field 15 and a first centring pin 22 and a second centring pin 24. As shown in particular in FIG. 4, the receptacle 20 has the basic shape of a rectangle with a longitudinal axis 41. The longitudinal axis 41 is in particular a longitudinal center axis and divides the receptacle 20 centrally in the top view according to FIG. 4.

The contact field 15 lies symmetrically to the longitudinal axis 41. Two contacts 17 lie at a distance from each other on the longitudinal axis 41. In top view, two further contacts 17 lie on each side of the longitudinal axis 41, so that a contact field 15 symmetrical to the longitudinal axis 41 is formed from six contacts 17.

At least one engagement element 35 is provided in the region of the narrow sides of the receptacle 20, which engagement element can be configured in particular as a centring pin 22 or 24. In the embodiment shown, two engagement elements 35 are provided at a distance a from each other. The distance a is smaller than the length b of the communication module 12. Preferably, the distance a is 80% to 95% of the length b, in particular 88% to 92% of the length b. The engagement elements 35, which in the embodiment are formed as centring pins 22 or 24, form the receptacle 20 for fixing the position of the communication module 12 in a manner fixed relative to the housing. The engagement elements 35 or the centring pins 22 and 24 lie on the longitudinal axis 41 of the receptacle 20. The contact field 15 lies between the engagement elements 35. Preferably, the contact field 15 lies at a shorter distance from one centring pin 22 than from the other centring pin 24.

Figure 1:
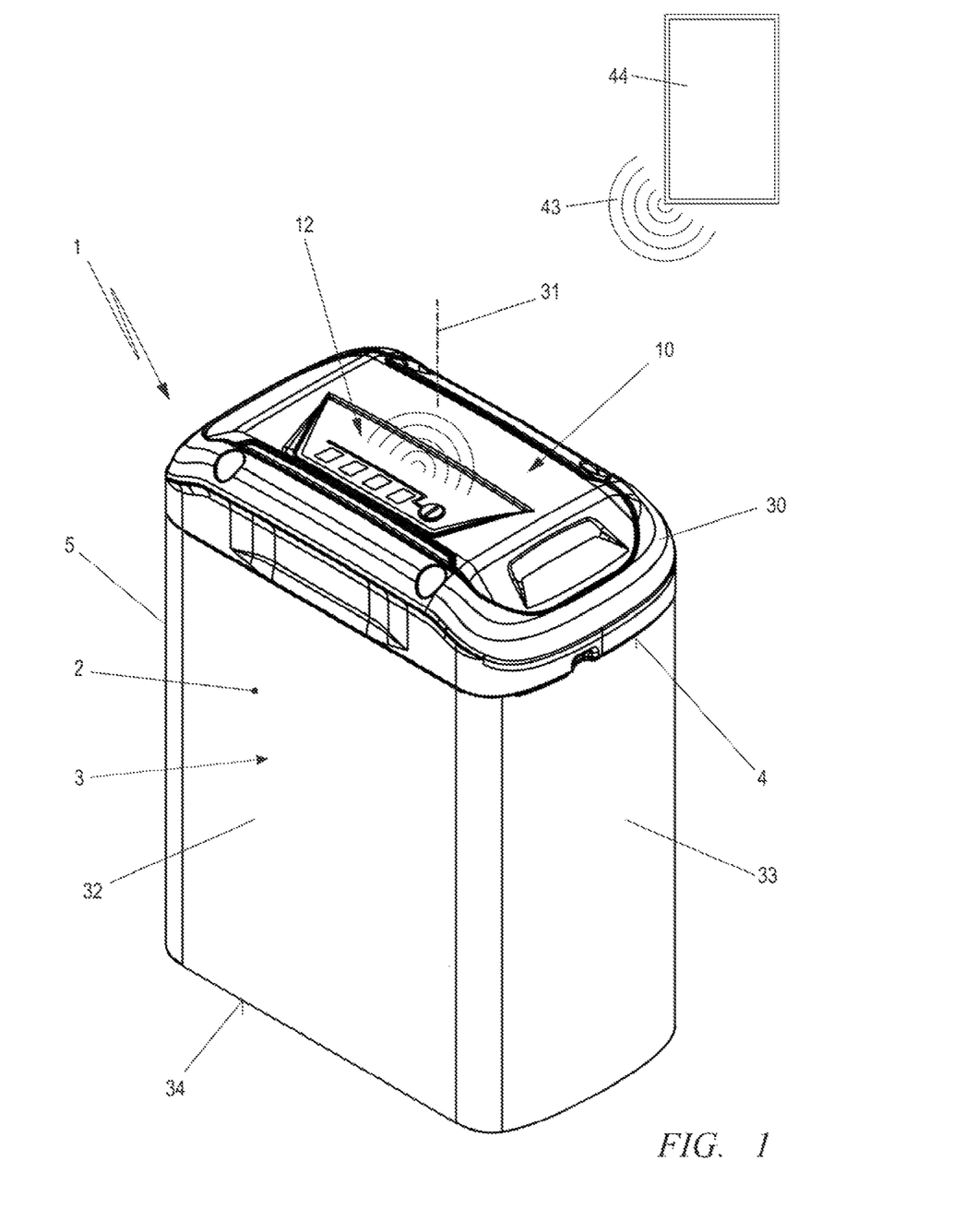
FIG. 1 is a perspective view of a housing using the example of a battery pack for receiving battery cells.

As can be seen from the illustrations in FIGS. 2 to 4, optical display elements 29 of the monitoring device 9 are located outside the frame 20'. As shown in FIG. 1, these optical display elements 29 are visible through the closed closure cap 10 of the receiving space 40.

Figure 5:
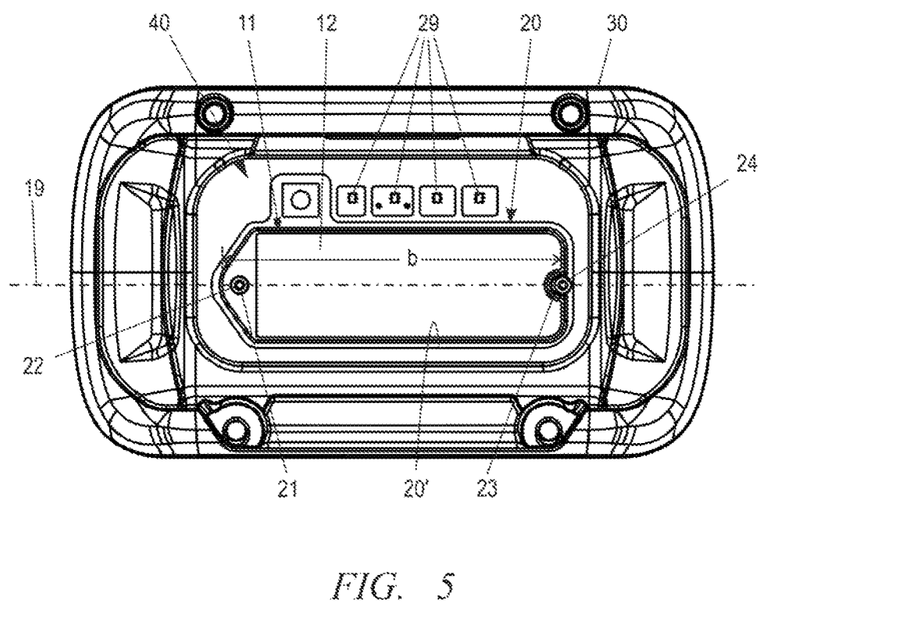
FIG. 5 is a top view of the communication module held in a receptacle in the receiving space in the housing cover.

As FIG. 5 shows, the communication module 12 is held fixed in the receptacle 20 via the engagement elements 35. The communication module 12 is fixed via the engagement elements 35, in the embodiment via the centring pins 22 and 24, which engage in corresponding centring openings 21 and 23, respectively, in the component 11 of the communication module 12. In this case, the communication module 12 forms an independent, self-contained component 11.

Figure 6:
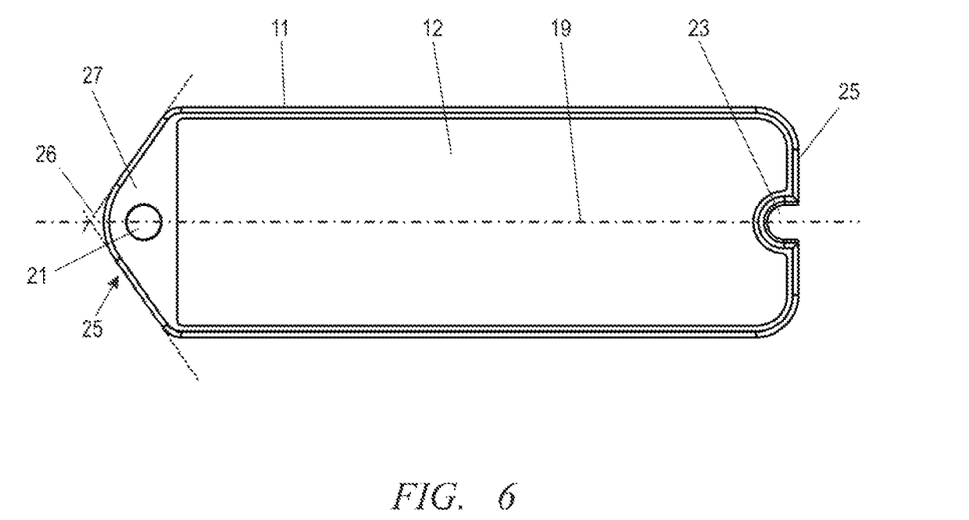
FIG. 6 is a top view of a communication module.
Figure 7:
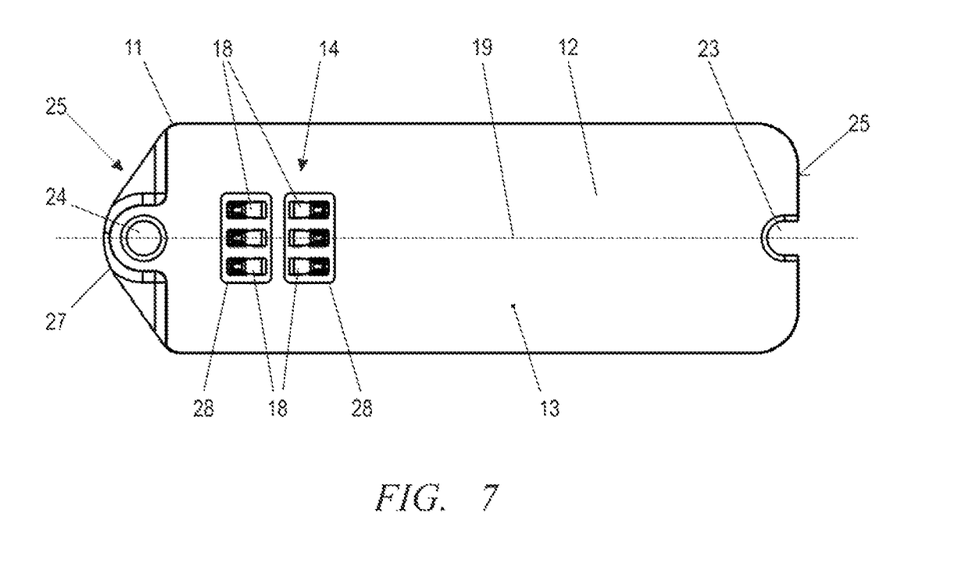
FIG. 7 is a top view of the contact side of the communication module.

The physical configuration of the communication module 12 as an independent component 11 is shown in FIGS. 6 and 7. The basic shape of the communication module 12 is rectangular and corresponds especially approximately to the rectangular shape of the frame 20' of the receptacle 20, as shown for example in FIG. 4 in plan view. The communication module 12 has a longitudinal axis 19 (FIG. 6), which is in particular provided as a longitudinal center axis. The centring openings 21 and 23 provided for engagement of the engagement elements 35 formed as centring pins 22 and 24 lie in the region of the narrow sides 25 of the basic shape of the preferably rectangular communication module 12. The centring openings 21 and 23 lie on the longitudinal axis 19 of the component 11.

One centring opening 23 is open towards the narrow side 25 of the component 11, so that a centring pin 24 can also be inserted radially into the centring opening 23. The other centring opening 21 on the other narrow side 25 of the component 11 lies in a practical nose-shaped projection 27. The side faces of the projection 27 enclose an angle 26 of approximately 80 to 120°, in particular 110°.

Contact elements 14 are provided on the contact side 13 (FIG. 7) of the communication module 12 and are assigned to the contacts 17 of the contact field 15 in the receptacle 20. The contact elements 14 are preferably configured as contact springs 18. Two contact springs 18 lie at a distance from each other on the longitudinal axis 19 of the component 11. In the top view according to FIG. 7, two further contact springs 18 lie on each side of the longitudinal axis 19, so that a total of six contact springs 18 are provided. Two contact rows 28 are formed with contact elements 14, in particular contact springs 18, which are each oriented symmetrically with respect to the longitudinal axis 19. It may be expedient, alternatively or additionally, to form one, several or all contacts 17 of the contact field 15 as contact springs.

The contact elements 14 lie at a shorter distance from one centring opening 21 than from the other centring opening 23. In the embodiment shown, the contact elements 14 lie at a greater distance from the centring opening 23, which is slot-shaped.

Figure 8:
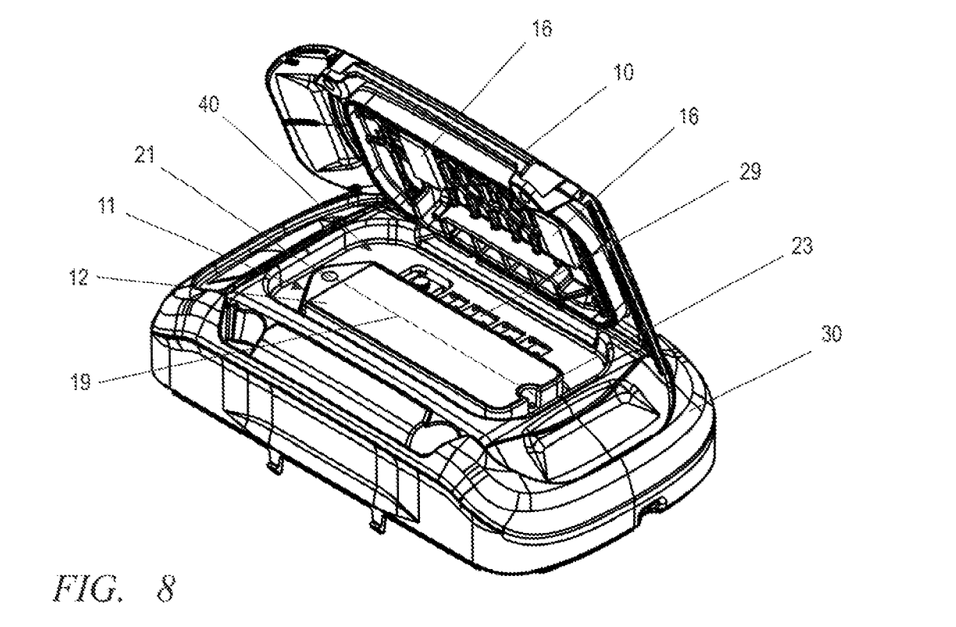
FIG. 8 is a perspective view of the housing cover according to FIG. 2 with a communication module held in a receptacle in the receiving space.
Figure 9:
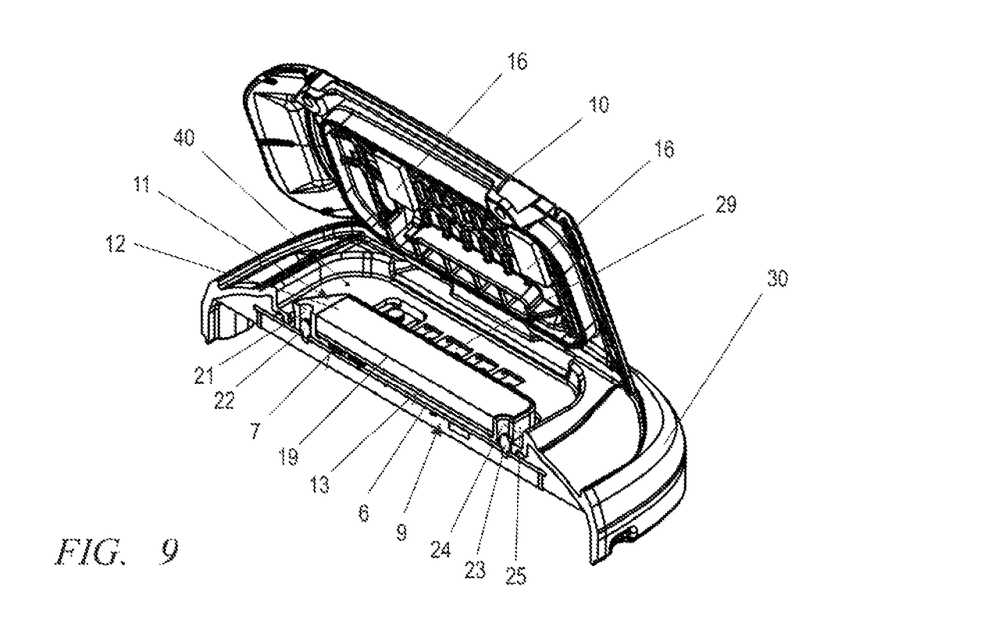
FIG. 9 is a section through the housing cover according to FIG. 8 with the communication module held in a receptacle in the receiving space.
Figure 10:
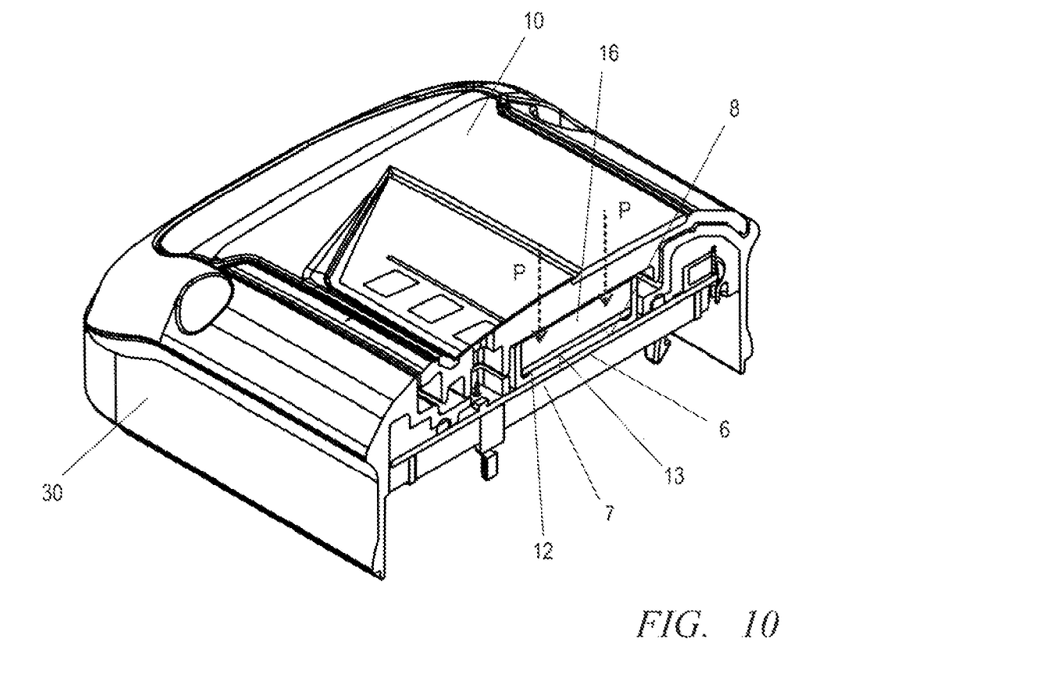
FIG. 10 is a perspective view of a section through the housing cover with a receiving space closed by the closure cap and a communication module held therein.
Figure 11:
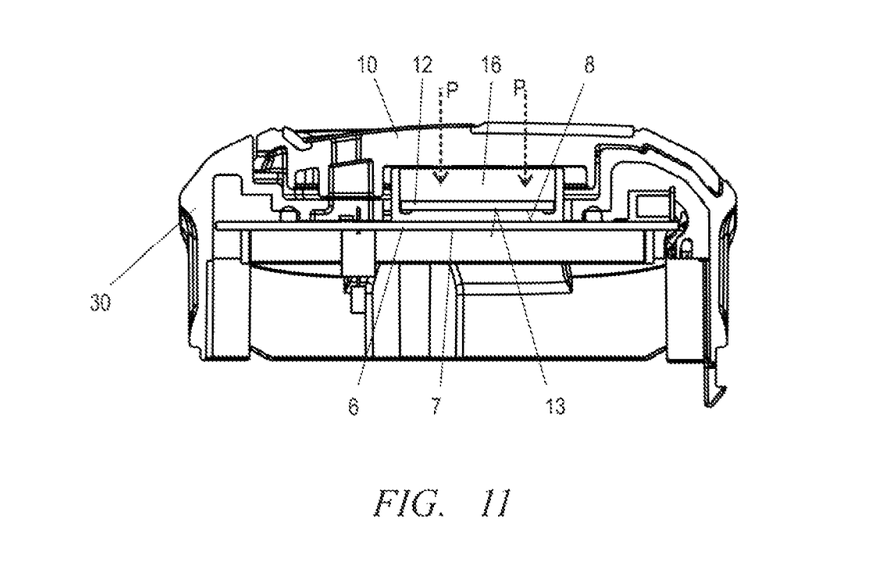
FIG. 11 is a top view of the section shown in FIG. 10 through a housing cover with a communication module held in a receptacle in the receiving space.

As shown in FIGS. 8 and 9, the communication module 12 is fixed in position in the housing 5 itself by insertion into the receptacle 20 fixed to the housing. To insert the communication module 12 into the receiving space 40, the centring opening 23 open towards the end face 25 is pushed onto the centring pin 24 in the direction of the longitudinal axis 41 of the receptacle 20. When the centring pin 24 is in the centring opening 23, the communication module 12 is swivelled into the receptacle 20 and the centring opening 21 is placed on the centring pin 22. The communication module 12 is fixed in position in the housing by the centring pins 22 and 24. To facilitate the insertion of a centring pin 22, 24 into a centring opening 21, 23, the centring pins 22, 24 are conically tapered at least in the region of their free end.

In the fixed position within the receptacle 20, electrical contact is ensured between the contact field 15 of the receptacle and the contact elements 14 of the communication module 12, which contact elements are preferably configured as contact springs 18. The configuration is such that contacts 17 of the contact field 15 rest on one contact element 14 each of the communication module 12 in an electrically contacting manner. The communication module 12 is connected to the monitoring device 9 via the contacts 17 and the contact elements 14. On the one hand, power is supplied to the communication module 12 via two contacts 17 and two contact elements 14 in each case. On the other hand, data are transmitted via the further contacts 17 and the contact elements 14 resting on them. The data transmission is bidirectional, that is, data can be transmitted from the communication module 12 to the monitoring device 9, and data can also be transmitted from the monitoring device 9 to the communication module 12. The communication module 12 is configured to wirelessly transmit the data received from the monitoring device 9 to a transmitting and/or receiving unit 44 provided in the environment via a wireless connection 43. The received data can be displayed directly on the transmitting and/or receiving unit 44, evaluated, processed further or stored via a further wireless connection, for example in a cloud. Data can also be made available for upload by the transmitting and/or receiving unit 44, which is received in the communication module 12 and forwarded to the monitoring device 9. The received data can be further processed and/or evaluated in the monitoring device 9 and/or in the communication module 12. If the communication module 12 is installed in a work apparatus, operating data of the work apparatus can be output wirelessly to the outside and/or corrected data can be transmitted to the work apparatus via the communication module 12 for further processing.

In the assembly position of the communication module 12 in the receptacle 20 shown in FIGS. 5, 8 and 9, the contact elements 14 of the communication module 12, which contact elements are configured as contact springs 18, rest on the contacts 17 of the contact field 15 of the circuit board 6 in an electrically contacting manner. The communication module 12 lies within the frame 20'. As FIG. 5 shows, a gap remains between the frame 20' and the outer edge of the communication module 12, in particular a circumferential gap. The position of the communication module 12 in the receptacle 20 is preferably fixed exclusively by the form-fitting engagement of an engagement element fixed to the housing, in the shown embodiment by the centring pins 22 and 24.

Within the scope of the disclosure, a configuration is also possible in which the independent component 11 of the communication module 12 engages with a mechanical engagement element in a recess of the receptacle 20 fixed to the housing.

In order to ensure an electrically stable contact between the contacts 17 in the receptacle 20 and the contact elements 14 of the communication module 12 on the one hand and to hold the communication module 12 securely in the receptacle 20 on the other hand, it is provided to press the communication module 12 into the receptacle 20 by at least one pressure element 16. The pressure element 16 is preferably arranged between the closure cap 10 and the component 11 of the communication module 12. The pressure element 16 can advantageously be part of the closure cap 10. Expediently, the pressure element can also be provided as a separate component, for example in the form of an intermediate layer. Such a separate component can, for example, be placed on the communication module 12. When the closure cap 10 is closed, the separate component or the intermediate layer is compressed, thereby exerting pressure on the communication module 12.

As can be seen from FIGS. 8 to 11, the closure cap 10 has at least one pressure element 16 which comes to rest on the component 11 of the communication module 12 when the receiving space 40 is closed and presses the component into the receptacle. In the shown embodiment, two pressure elements 16 are provided, each of which exerts a pressing force P on the communication module 12 in the region of the narrow sides of the component 11 when the closure cap 10 is closed.

The pressure element 16 can be configured as a spring. Especially, the pressure element is an elastomeric pad. Such an elastomeric pad can, for example, be glued to the inside of the closure cap 10. In particular, the pressure element 16 is made of the material Cellasto® (registered trademark of the company BASF).

Figure 12:
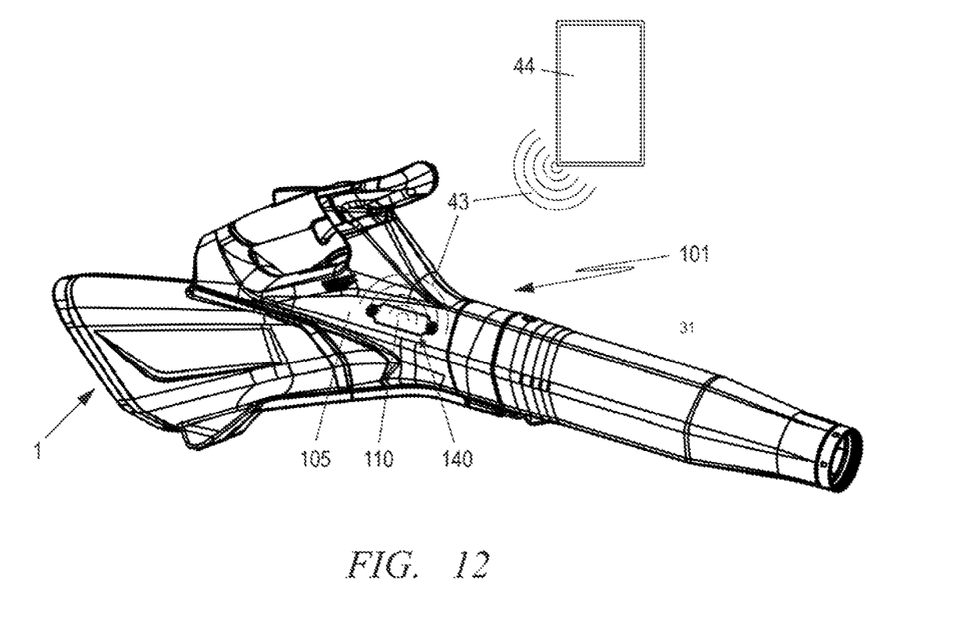
FIG. 12 is a perspective view of a handheld work apparatus, for example a blower, with a housing and a receiving space for a communication module, which receiving space is formed in the housing and closed by a closure cap.
Figure 13:
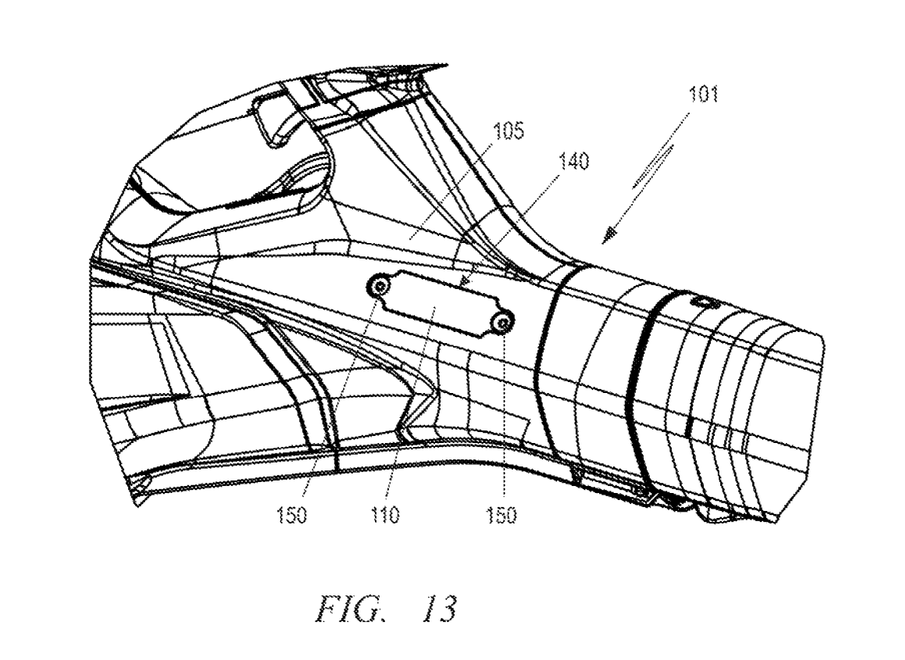
FIG. 13 is an enlarged view of the receiving space in the housing of the work apparatus according to FIG. 12, which receiving space is closed by a closure cap.

In a further embodiment according to FIGS. 12 to 15, the communication module 12 is inserted in a receiving space 140 of the housing 105 of a handheld, in particular portable, work apparatus 101. The handheld, in particular portable, work apparatus 101 of the embodiment according to FIG. 12 is a blower, in particular a battery-powered blower. The work apparatus can also be driven by an internal combustion engine.

In the housing 105 of the work apparatus 101, the receiving space 140 is formed and is covered by a closure cap 110. The closure cap 110 is fixed to the housing 105, in particular at opposite ends, in each case by a fastening means 150, preferably a fastening screw, as shown in an enlarged manner in FIG. 13.

A receptacle 20 is formed in the receiving space 140 and corresponds in structure and mode of operation to the receptacle 20 of FIGS. 1 to 11; like parts are provided with like reference signs.

Figure 14:
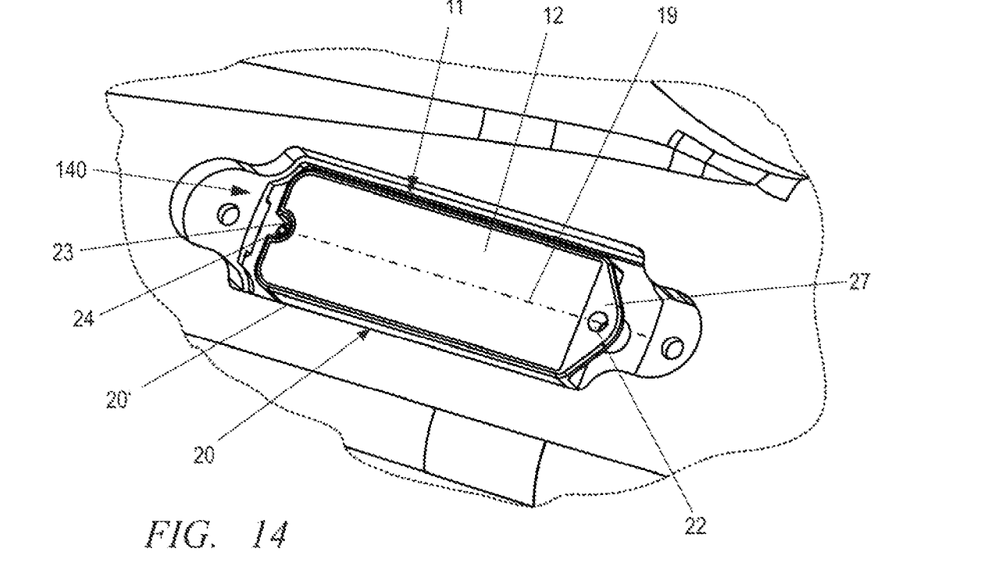
FIG. 14 is an enlarged view, corresponding to FIG. 13, of an open receiving space with the communication module arranged therein.
Figure 15:
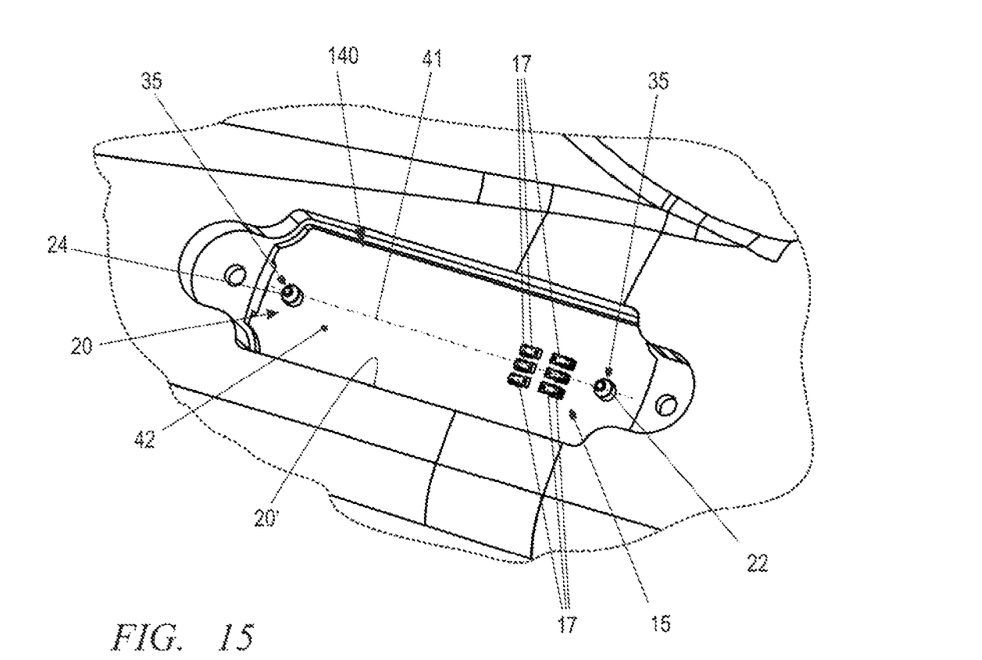
FIG. 15 is an enlarged view according to FIG. 13 of the receiving space for a communication module with a contact field provided in the floor of the receiving space.

FIGS. 14 and 15 show the open receiving space 140 of the housing 105. FIG. 15 shows the receptacle 20 inside the receiving space 140 with an outer frame 20'. The position of the communication module 12 in the receptacle 20 is fixed by means of the engagement elements 35, which are preferably in the form of centring pins 22 and 24 and are in particular fixed to the housing. A contact field 15 with contacts 17 is formed in the base 42 of the receptacle 20, via which contact field an electrical connection can be established with an electronic circuit provided inside the housing 105. The electronic circuit can detect power data, operating time, remaining operating time, temperature of the used battery pack 1, the voltage of the battery pack and/or the operating current and the like and can make them available at the contacts 17. An electronic circuit is also understood to be an ignition device provided in the housing of a work apparatus with an internal combustion engine.

A communication module 12 inserted into the receptacle 20 rests with its contact elements 14 on the contacts 17 of the contact field 15 in the base 42 of the receptacle 20. Advantageously, the contact elements 14 are configured as contact springs 18. The communication module 12, which forms an independent component 11, has centring openings 21 and 23, in which the engagement elements 35, which are configured as centring pins 22 and 24, engage. This fixes the communication module 12 in its position within the receiving space 40 and preferably within the frame 20' so that it is fixed to the housing.

After insertion of the communication module 12, the receiving space 140 is closed by the closure cap 110, with a pressure element being provided between the closure cap 110 and the communication module 12. This pressure element exerts a pressing force on the component 11 of the communication module 12 after the closure cap 110 has been screwed tight, as a result of which the communication module 12 is fixed in a vibration-resistant manner in the receptacle 20 in the receiving space 140. The pressure element can be a foam pad, a spring element or similar compressible pressure element.

As shown in FIG. 12, data can be exchanged between the communication module 12 in the housing 105 and an external transmitting and/or receiving unit 44 via the communication module 12 and the wireless connection 43. The wireless connection is in particular a bidirectional wireless connection 43.

In a further embodiment according to FIGS. 16 to 19, the communication module 12 is inserted into a receiving space 240 of the housing 205 of a handheld, in particular portable, work apparatus 201. The handheld, in particular portable, work apparatus 201 of the embodiment according to FIG. 12 is a motorized chain saw, in particular a battery-powered motorized chain saw. The work apparatus can also be driven by an internal combustion engine.

The receiving space 240 is formed in the housing 205 of the work apparatus 201 and is covered by a closure cap 210. The closure cap 210 is fixed to the housing 205, in particular at opposite ends, in each case by a fastening means 150, preferably a fastening screw, as shown in an enlarged manner in FIG. 17.

The receptacle 20 formed in the receiving space 140 corresponds in structure and operating principle to the receptacle 20 of FIGS. 1 to 11; like parts are provided with like reference signs.

Figures 18, 19:
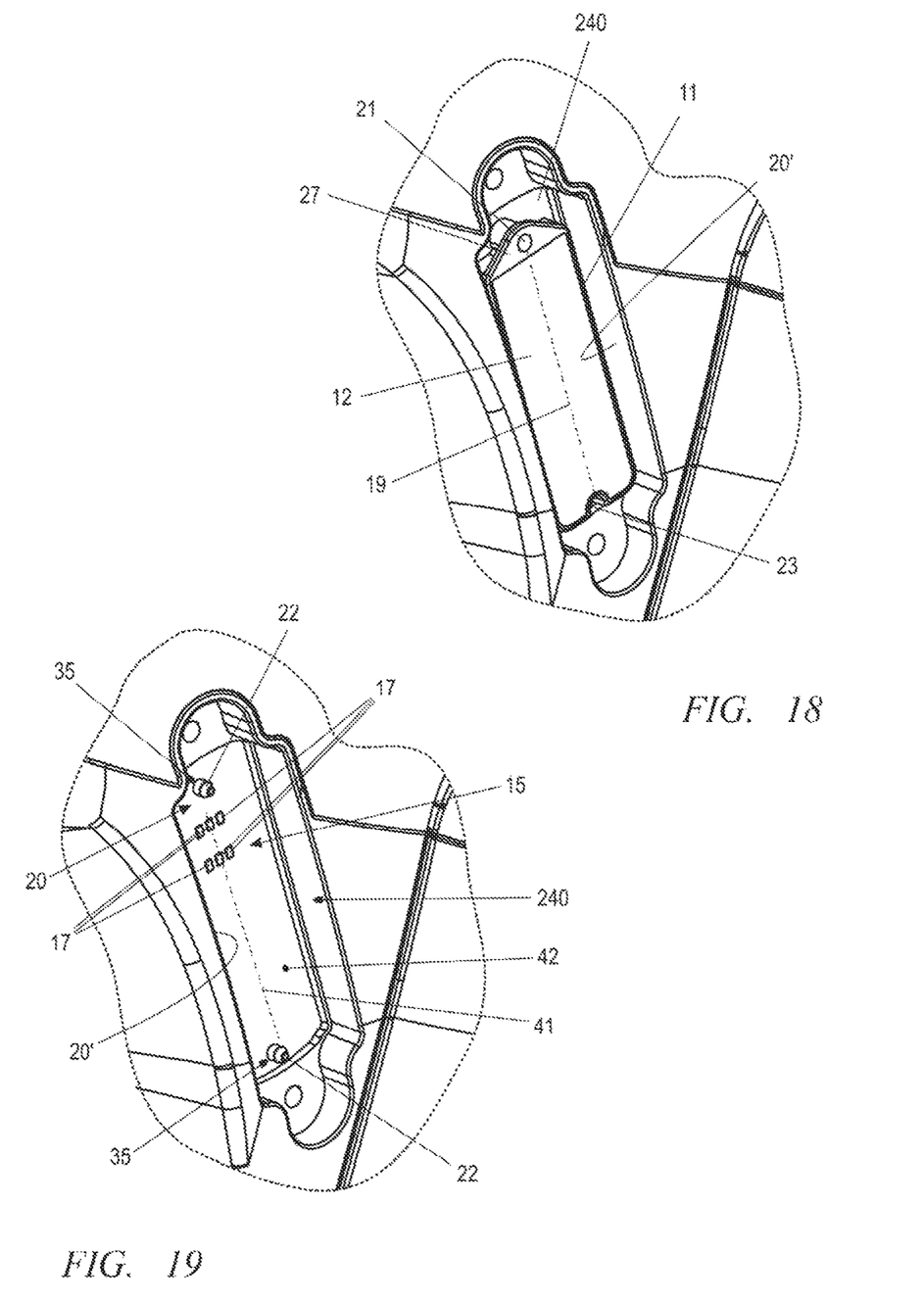

FIGS. 18 and 19 show the open receiving space 240 of the housing 205. In FIG. 19, the receptacle 20 is shown with an outer frame 20', with the positional fixing of the communication module 12 being ensured by means of the engagement elements 35, which are preferably configured as centring pins 22 and 24 and are preferably fixed to the housing. A contact field 15 with contacts 17 is formed in the base 42 of the receptacle 20, via which contact field an electrical connection can be established with an electronic circuit provided within the housing 105. The electronic circuit can, for example, record performance data, operating time, remaining operating time, temperature of the used battery pack 1, the voltage of the battery pack and/or the operating current and the like and can make them available at the contacts 17.

A communication module 12 inserted into the receptacle 20 rests with its contact elements 14, preferably configured as contact springs 18, on the contacts 17 of the contact field 15 in the base 42 of the receptacle 20. The communication module 12, which forms an independent component 11, has centring openings 21 and 23 in which the engagement elements 35, which are configured as centring pins 22 and 24, engage. In this way, the communication module 12 is fixed in its position within the receiving space 240 and preferably within the frame 20' in a manner that is fixed to the housing.

After insertion of the communication module 12, the receiving space 240 is closed by the closure cap 110, with a pressure element being provided between the closure cap 210 and the communication module 12. This pressure element exerts a pressing force onto the component 11 of the communication module 12 after the closure cap 210 has been screwed tight, as a result of which the communication module 12 is fixed in a vibration-resistant manner in the receptacle 20 in the receiving space 140. The pressure element may be a foam pad, a spring element or similar compressible pressure element.

Figure 16:
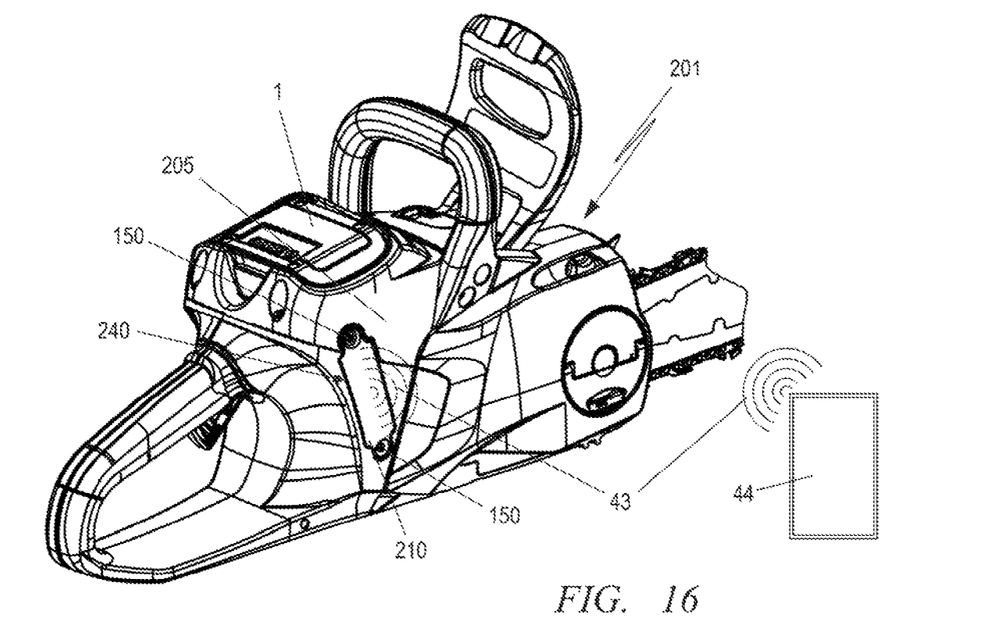
FIG. 16 is a perspective view of a handheld work apparatus on the basis of the example of a motorized chain saw, with a housing and a receiving space for a communication module, which receiving space is formed in the housing and closed by a closure cap.
Figure 17:
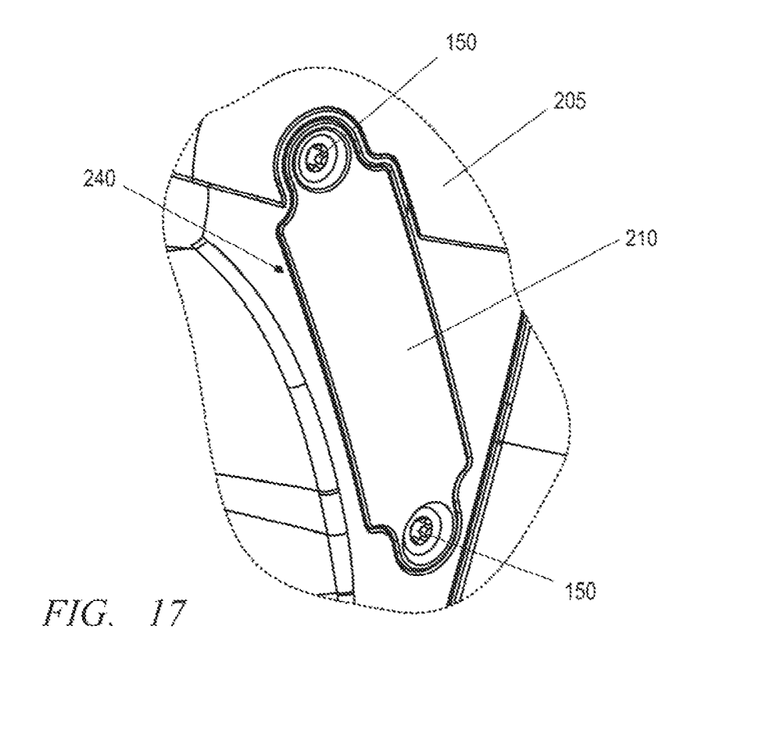
FIG. 17 is an enlarged view of the receiving space in the housing of the work apparatus according to FIG. 16, which receiving space is closed by a closure cap.

As shown in FIG. 16, data can be exchanged between the communication module 12 in the housing 205 and an external transmitting and/or receiving unit 44 via the communication module 12 and the wireless connection 43. The wireless connection is in particular a bidirectional wireless connection 43.

It is understood that the foregoing description is that of the preferred embodiments of the invention and that various changes and modifications may be made thereto without departing from the spirit and scope of the invention as defined in the appended claims.

What is claimed is:

1. A housing including for a battery pack, a hand-guided or hand-carried work tool, the housing comprising:
   a housing body having a plurality of electrical components arranged therein;
   said housing body defining a receiving chamber;
   a closure cover configured to close said receiving chamber;
   a plurality of electrical contacts provided under said closure cover;
   said plurality of electrical contacts being in electrical contact with said electrical components;
   a communication module configured as an independent component and arranged under said closure cover;
   said communication module being configured to wirelessly communicate with an external transmitting and/or receiving unit;
   said communication module being electrically connected to said plurality of electrical contacts in said housing body for wireless communication;
   a receptacle fixed in said housing body;
   said communication module being fixed in position in said housing body via said receptacle;
   said communication module having a contact side facing toward said plurality of electrical contacts and having a plurality of contact elements on said contact side;
   said plurality of contact elements of said communication module lying in electrical contact with said plurality of electrical contacts in said housing body;
   at least one pressure element pressing said communication module onto said plurality of electrical contacts in the housing; and,
   said at least one pressure element being arranged between said closure cover and said communication module.

2. The housing of claim 1, wherein said communication module has a rectangular basic shape and defines a longitudinal axis; and, said contact elements of said communication module lie symmetrically to said longitudinal axis of said communication module.

3. The housing of claim 1, wherein at least one of said plurality of contact elements of said communication module and said plurality of electrical contacts provided under the closure cover are configured as contact springs.

4. The housing of claim 1, wherein at least one mechanical engagement element is provided between said receptacle fixed in said housing body and said communication module; and, said engagement element is configured to fix said communication module so as to be fixed in said housing body.

5. The housing of claim 1, wherein at least one mechanical engagement element is provided between said receptacle and said communication module; and, said at least one mechanical engagement element is configured as a centring pin engaging in a centring opening.

6. The housing of claim 5, wherein said communication module has said centring opening and said centring pin is fixedly held in said housing body.

7. The housing of claim 5, wherein said communication module has a first centring opening for a first centring pin and a second centring opening for a second centring pin.

8. The housing of claim 5, wherein said communication module has a rectangular basic shape and defines a longitudinal axis and said centring opening lies on said longitudinal axis of the communication module.

9. The housing of claim 5, wherein said centring opening is provided in a region of opposite narrow sides of said communication module.

10. The housing of claim 5, wherein said centring opening is open toward a narrow side of said communication module.

11. The housing of claim 1, wherein said at least one pressure element is a compressible body.

12. The housing of claim 1, wherein said at least one pressure element is an elastomeric body.

13. The housing of claim 1, further comprising:
a circuit board;
said housing body defining an interior space;
said circuit board having an inner side facing toward said interior space and an outer side facing away from said interior space; and,
said plurality of electrical contacts being arranged on said outer side of said circuit board.

14. The housing of claim 13, wherein said plurality of electrical contacts arranged on said outer side of said circuit board are configured as contact fields of said circuit board.

15. The housing of claim 13, wherein said interior space of said housing body defines a receiving space for a cell group; and, said circuit board closes off said interior receiving space of said cell group on the side of said closure cover.

16. The housing of claim 15, further comprising an electronic monitoring device carried by said circuit board and being electrically connected to said cell group.

17. The housing of claim 16, further comprising a battery pack including said cell group.

* * * * *